United States Patent [19]

Koga

[11] 4,082,522
[45] Apr. 4, 1978

[54] METHOD AND APPARATUS OF CLEANING DUST-CONTAINING GASES

[75] Inventor: Tetsuaki Koga, Tokyo, Japan

[73] Assignee: Kokudo Doro Company Ltd., Tokyo, Japan

[21] Appl. No.: 600,516

[22] Filed: Jul. 30, 1975

[30] Foreign Application Priority Data

Jun. 9, 1975  Japan .................................. 50-69927

[51] Int. Cl.² ............................................ B01D 47/02
[52] U.S. Cl. .......................................... 55/95; 55/223; 55/240; 55/256; 55/419; 55/227; 261/77; 261/124
[58] Field of Search ........................ 55/83, 84, 95, 220, 55/223, 227, 240, 244, 256, 419, 249, 255; 261/77, 121, 124, 76

[56] References Cited

U.S. PATENT DOCUMENTS

| 773,784 | 11/1904 | Brunck | 261/124 X |
|---|---|---|---|
| 1,223,684 | 4/1917 | Fleming | 55/227 X |
| 1,339,609 | 5/1920 | Stinson | 55/227 X |
| 2,128,311 | 8/1938 | Mertes | 261/76 X |
| 2,719,032 | 9/1955 | Schnur | 261/124 X |
| 2,790,506 | 4/1957 | Van Vactor | 261/77 X |
| 2,852,239 | 9/1958 | Vicard | 261/76 X |
| 3,464,189 | 9/1969 | Mergenthaler | 261/77 X |
| 3,655,361 | 4/1972 | Brown et al. | 55/419 X |
| 3,763,634 | 10/1973 | Alliger | 55/223 |

FOREIGN PATENT DOCUMENTS

| 17,426 | 8/1904 | Austria | 261/121 R |
|---|---|---|---|
| 3,332,845 | 5/1972 | U.S.S.R. | 55/249 |

Primary Examiner—Frank W. Lutter
Assistant Examiner—David L. Lacey
Attorney, Agent, or Firm—Irving M. Weiner; Pamela S. Austin

[57] ABSTRACT

A system wherein a first dust-containing gas current is jetted out through a jetting port. A gas current is jetted out from a direction opposed to the first gas current, and both gas currents are made to collide with each other. The flow velocity of the dust-containing gas current is made to quickly and infinitely approach zero and only the contained dust is made to advance by its inertia force. A washing liquid is sent into the gas collision system, and the dust in the gas current is made to collide with the washing liquid at a high velocity by its inertia force. The dust in the gas is caught with the washing liquid. To make the dust-containing gas current collide with the gas current opposed to it, the dust-containing gas is pressed into a dust collector with means, such as a pump, and is jetted out through jetting ports opposed to each other in the dust collector. As a means of sending the washing liquid into the system wherein the gas current collides, and wherein gas flow velocity is made to quickly and infinitely approach zero and only the contained dust is made to advance by the inertia force, the washing liquid is pre-contained in the gas or sprinkled in the system, or the jetting ports opposed to each other are dipped in the washing liquid. The liquid pressure and jetting pressure are balanced with each other so that a film of the washing liquid may be formed in the gas current collision system.

9 Claims, 11 Drawing Figures

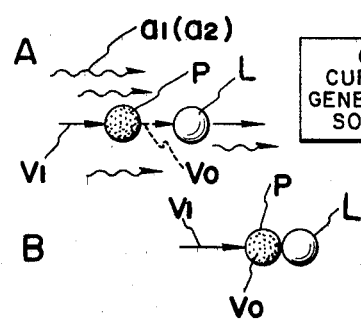
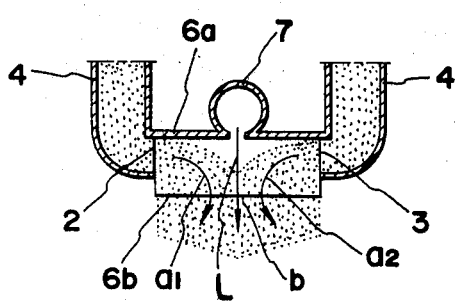
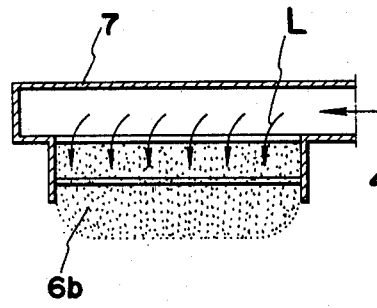
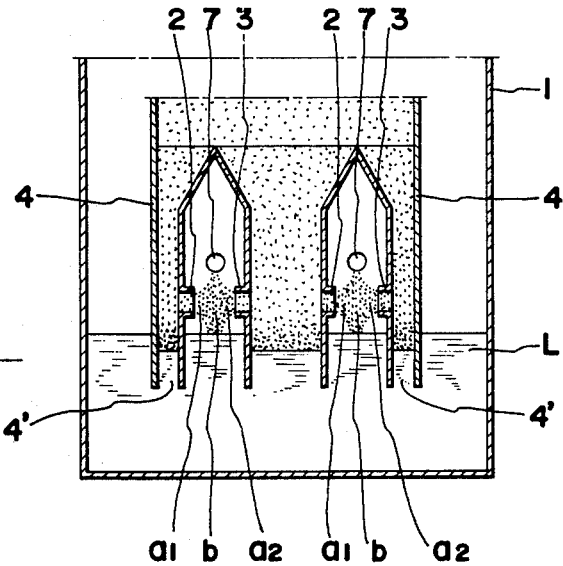

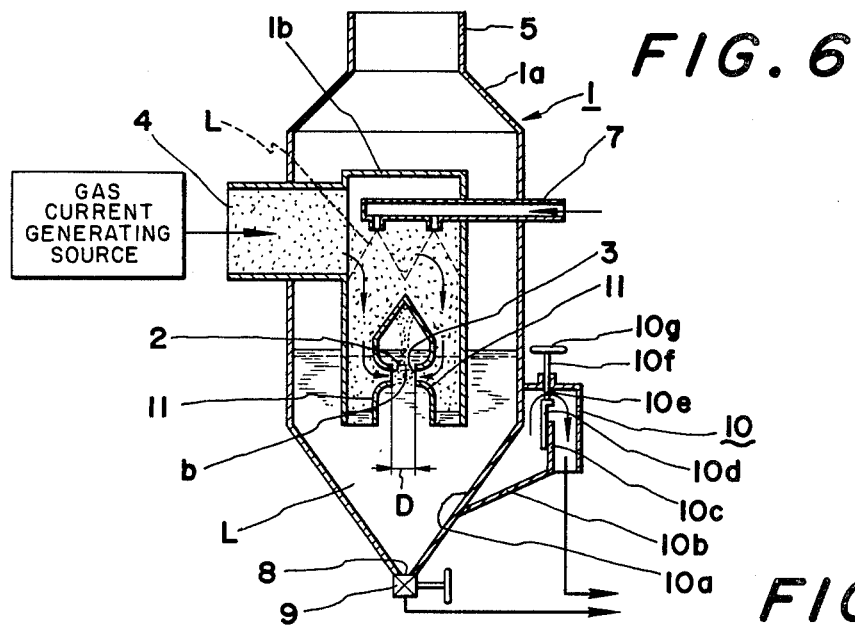
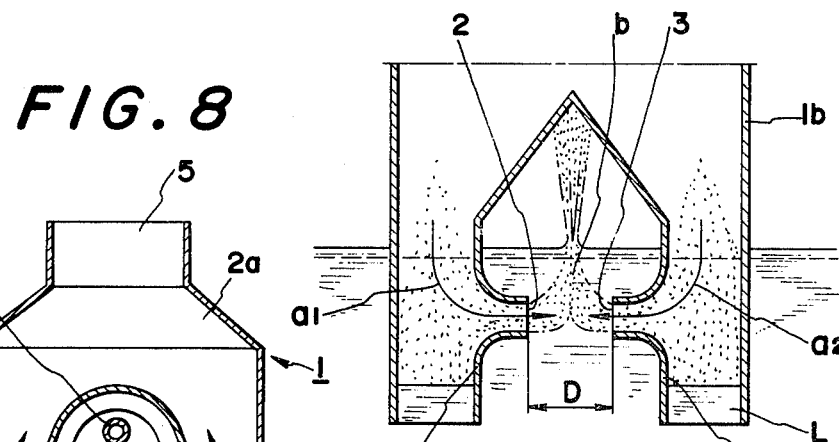
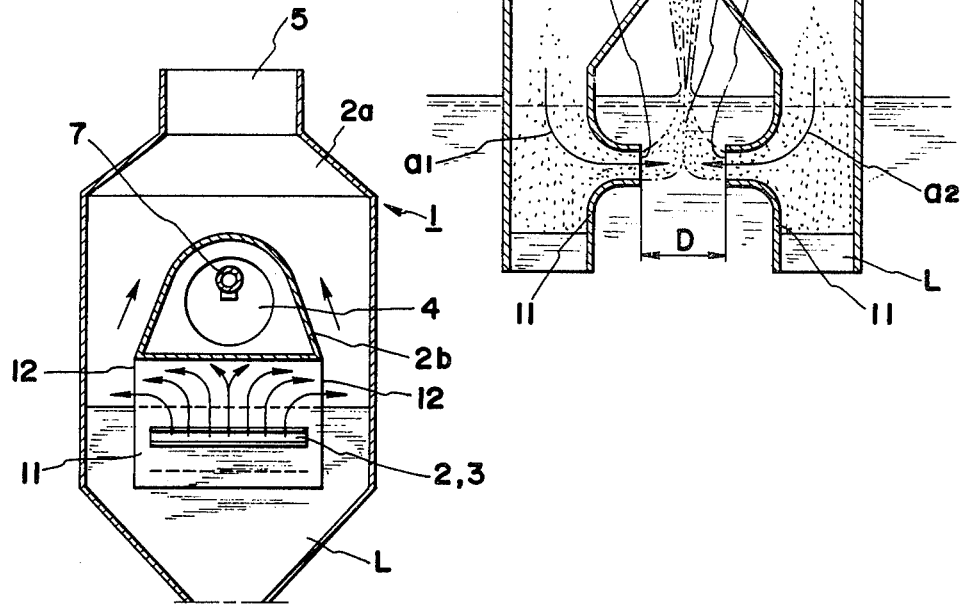

METHOD AND APPARATUS OF CLEANING DUST-CONTAINING GASES

The present invention relates to a method of cleaning a gas containing dust, and an apparatus for carrying out such method. In particular, the invention relates to a method of cleaning dust-containing gases by a wet means, and to apparatus adapted to perform such method. The invention provides a method wherein a dust-containing gas is made to collide with a gas current containing or not containing dust and jetted out from a direction opposed to it. The flow velocity of the dust-containing gas current is made to quickly and infinitely approach zero and only the dust contained in the gas current is made to advance by its inertia force so that the dust may be caught with a washing liquid.

BACKGROUND OF THE INVENTION

Generally, in a method and apparatus for cleaning dust-containing gases, there is conventionally adopted a system wherein a dust-containing gas current is brought into contact with such washing liquid as water and the dust in the gas is caught with the washing liquid. The principle of bringing a dust-containing gas into contact with a washing liquid to make the washing liquid catch the dust in said gas is confirmed and this conventional system is extensively worked.

However, in this conventional system, the rate of contact of the dust in the gas with the washing liquid is not always sufficiently high, and the actual dust removing effect has not been so high.

The present invention improves the rate of contact of the dust in the gas and the washing liquid with each other.

It has been discovered that the dust in the gas current in the conventional system will be most readily caught in the washing liquid only in the moment the washing liquid is fed into said gas current but, with the lapse of time, the washing liquid will ride the gas current and will begin to move and, when the washing liquid comes to move at a velocity equal to that of the gas current, the rate of contact of the dust with the washing liquid will be a minimum.

It is presumed to be so because, when the moving velocity of the washing liquid and the moving velocity of the dust become equal or approximately equal to each other, the possibility of the dust coming into contact with the washing liquid in the advancing direction of the dust will become nil and, even if the dust overtakes the washing liquid or the washing liquid overtakes the dust, they will pass each other without coming into contact due to swirls formed around each of them.

Among the conventional apparatus, there is a venturi scrubber type dust removing apparatus wherein, in order to bring the dust and washing liquid into contact with each other, the dust-containing gas current is throttled with a venturi tube to increase the velocity of said gas current.

However, such conventional apparatus has difficulty in that the pressure loss is so large that, in the case of treating a large volume, a large power source will be required.

SUMMARY OF THE INVENTION

The present invention provides a method of cleaning a gas containing dust, including the steps of producing a gas current containing dust, and producing a second gas current. The method includes the steps of directing the first gas current to move in a first predetermined direction, and directing the second gas current to move in a second predetermined direction which is substantially opposite to that of the first predetermined direction. The first and second gas currents are caused to collide with each other. A washing liquid is applied to the collided gas currents to catch the dust. The gases are separated from the washing liquid containing the caught dust to provide the clean gas.

The difference between the flow velocity of the dust and the flow velocity of the washing liquid is referred to herein as the "relative velocity", and the higher this relative velocity, the larger the rate of contact of the dust and washing liquid with each other.

As a concrete means of increasing such relative velocity, there is formed a surface on which gas currents are opposed to each other and are made to collide with each other and the flow velocity of the gas is made to quickly and infinitely approach zero in said colliding system so that the subsequent continuous dust-containing gas current may collide with said surface and the dust having a high velocity and held by its inertia force may collide with and contact the washing liquid having a flow velocity infinitely approaching zero.

In view of such problems of the conventional technique as are described above, the present invention attains the following objects.

The present invention positively separates and removes dust from a dust-containing gas by a simple means.

An object of the present invention is to clean a dust-containing gas at a high rate.

Another object of the present invention is to provide a gas cleaning apparatus wherein the exhausting efficiency is not unduly burdened.

A further object of the present invention is to provide a dust-containing gas cleaning means which is simple to maintain and is low in the cost required for maintenance.

The present invention also provides a method wherein a dust-containing gas current is made to collide with a gas current jetted out from a direction opposed to it and, in the system in which said gas current collides, the dust in the gas current is made to collide at a high velocity with a washing liquid whose flow velocity is substantially close to zero and wherein the dust is caught. The dust-containing washing liquid is separated from the gas current. For that purpose, a gas current jetting port to jet out the dust-containing gas current is set to face a gas current jetting port paired with it in a dust collector. In order to form a substantial washing liquid film by feeding a washing liquid to this gas current colliding system in a state infinitely close to zero in the direction of the gas current, a substantial liquid film can be naturally formed in the gas current colliding system by imparting the washing liquid made misty in advance to the gas current. Alternatively, there can be adopted a system wherein the washing liquid is separately sprinkled through a sprinkling tube in the gas current colliding system or a system wherein gas current jetting ports opposed to each other are dipped in the washing liquid and the liquid pressure and gas pressing force are balanced with each other so that a film of the washing liquid may be formed in the gas current colliding system.

The washing liquid film which is substantially compact enough to catch dust which comes flying with an inertia force is formed in the gas current colliding system in which the gas current is quickly reduced in the velocity and is quickly changed in the flowing direction. However, the dust, given an inertia force by the gas current, comes into contact with the washing liquid and is caught.

In case the gas currents jetted out as opposed to each other are dust-containing gas currents and the flow velocity of each gas current is equal to that of the other, if one of the gas currents is assumed to be stationary, the respective gas currents will collide with each other at a velocity twice as high. The dust, having the inertia force obtained in the gas current just before the collision, will thrust into and contact the liquid film, that is, the washing liquid with an inertia force substantially twice as large. Thus, by making the dust come flying at a high velocity thrust into the substantially stationary washing liquid, the dust is positively caught by the washing liquid.

BRIEF DESCRIPTION OF THE DRAWINGS

FIG. 1 is a principle explaining view.

FIG. 2 is a sectioned elevation of an embodiment of the present invention.

FIG. 3 is a sectioned elevation of a gas current jetting port of another embodiment.

FIG. 4 is a sectioned side view of the gas current jetting port shown in FIG. 3.

FIG. 5 is a sectioned elevation of still another embodiment.

FIG. 6 is a sectioned elevation of still another embodiment.

FIG. 7 is a magnified sectioned view of an inner case part of the embodiment shown in FIG. 6.

FIG. 8 is a central vertically sectioned view of the embodiment shown in FIG. 6.

DETAILED DESCRIPTION OF EMBODIMENTS OF THE INVENTION

Figure 9:
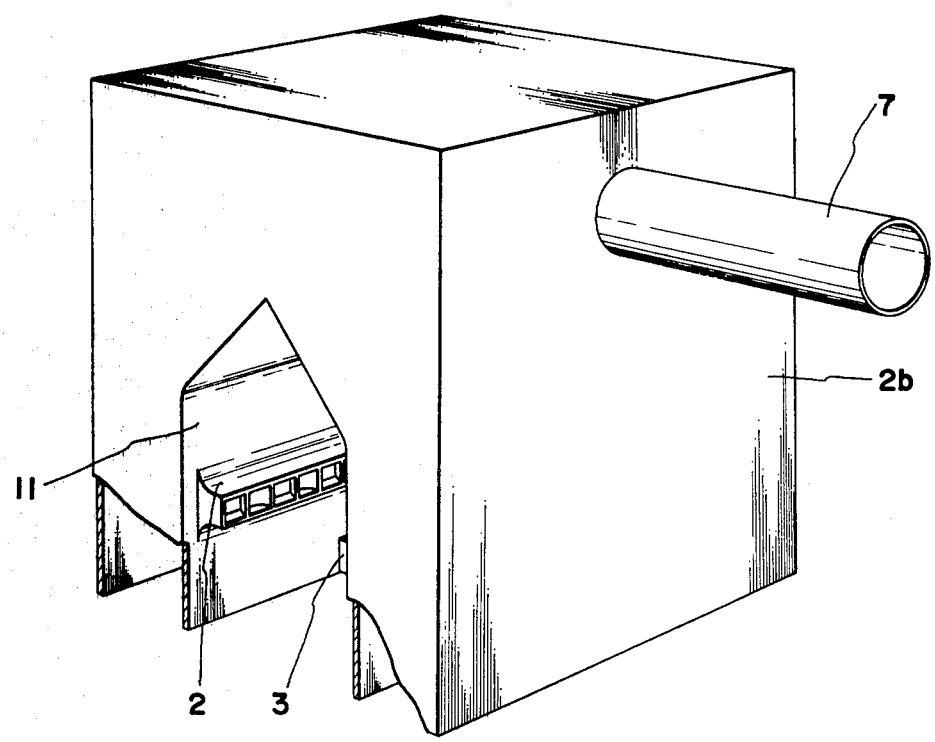
FIG. 9 is a perspective view of the inner case.

Various preferred embodiments of the present invention can be enumerated as follows.

The first embodiment is a method which can be effectively worked by such apparatus as is shown in FIGS. 2 to 5. That is to say, it is a method wherein, as shown in FIGS. 2, 3 and 6, a first gas current $a_1$ is made to collide with a second gas current $a_2$ jetted out from a direction opposed to it, dust in the gas current is made to collide with a washing liquid L at a high velocity and is caught and this dust containing washing liquid is separated from the gas current.

This method can be effectively worked by such apparatus as is shown in FIGS. 2, 3 and 5. This apparatus is an apparatus for cleaning dust-containing gas currents characterized in that a gas current jetting port 2 jetting out a dust-containing gas current $a_1$ is set to face a gas current jetting port 3 provided to be paired with it and jetting out a gas current $a_2$ in a dust collector 1. This method can be understood from the detailed explanation of the latter apparatus for working it. Therefore, the principle and fundamental formation of this method shall be explained together with the explanation of the apparatus.

In FIG. 2, a dust collector 1 is shown in which a gas feeding tube 4 is introduced and set. The dust collector 1 is of a known type having an exhaust cylinder 5. The gas feeding tube 4 introduced into said dust collector 1 is branched at the tip and said branched tips are respectively gas current jetting ports 2 and 3.

The respective gas current jetting ports 2 and 3 are so set as to face each other at a proper spacing.

A dust-containing gas current $a_1$ is introduced into the dust collector 1 through the gas feeding tube 4 from a dust-containing gas current generating source.

In the case of the embodiment in FIG. 2, the dust-containing gas current $a_1$ is divided into two currents by the branching of the gas feeding tube 4 and is jetted out through the gas current jetting ports 2 and 3 formed at the branched tips.

The dust-containing gas currents $a_1$ and $a_2$ are jetted out through the gas current jetting ports 2 and 3 so as to be opposed to each other and collide with each other. The respective dust-containing gas currents $a_1$ and $a_2$ are of the same source current and are therefore jetted out with the same force. Therefore, these dust-containing gas currents $a_1$ and $a_2$ form a surface filmy gas current colliding system $b$ in the middle between the respective gas current jetting ports 2 and 3.

While these gas currents are being pressed in or in the colliding system $b$, viz., while the dust-containing gas current $a_1$ or $a_2$ is flowing and moving through the gas feeding tube 4, as shown in A in FIG. 1, the dust P will ride the gas current $a_1$ or $a_2$ and will move at a velocity $V_1$ which is the velocity of the gas current or is close to it.

Here, if a washing liquid L in the form of a spray or liquid drops is imparted to this gas current $a_1$ or $a_2$, then the washing liquid L will begin to move at a velocity $V_0$ lower than the velocity $V_1$ of the gas current $a_1$ or $a_2$ or the dust P when it is first imparted into the gas current.

In such state, the relative velocity $(V_1 - V_0 = V)$ between the velocity $V_1$ of the dust P and the velocity $V_0$ of the washing liquid will be large, the dust P and washing liquid L will collide with each other and, as a result, the dust P will be caught by the washing liquid L.

However, when some time elapses, the washing liquid L will soon ride the gas current $a_1$ or $a_2$, the velocity of the washing liquid L will approach or equal the velocity $V_1$ of the dust P and the dust P and washing liquid L will neither approach each other nor separate from each other. This is a state in which the relative velocity of the dust P and washing liquid L is zero and the dust P is no longer caught by the washing liquid L.

Even if the washing liquid is imparted to the dust-containing gas current $a_1$ or $a_2$, no sufficient gas current washing effect will be obtained, because, as mentioned above, the relative velocity of the dust and washing liquid cannot be obtained to be large.

When the dust-containing gas currents $a_1$ and $a_2$ in such state are jetted out through gas current jetting ports 2 and 3 opposed to each other and are made to collide with each other, in the colliding system *b*, the relative velocity of the dust P and washing liquid L will be large and, as in B in FIG. 1, the dust P will collide with the washing liquid L and will be caught.

By the collision of the dust-containing gas currents $a_1$ and $a_2$, their flow velocity will quickly approach zero and the washing liquid L will impart a stagnant state in the surface filmy colliding system *b* but the dust P will come flying to said system at a high velocity through the gas current jetting port $a_1$ or $a_2$ due to its inertia or momentum force and will collide with the washing liquid L.

Thus, the dust P will be positively caught by the washing liquid L in the gas current colliding system $b$. In the gas current colliding system $b$, the quick reduction of the gas current velocity will occur and complicated gas current direction changes and swirls will be caused to occur there.

This produces an increase in the relative velocity of the dust P and washing liquid L, keeping a regular spacing between them in a state in which the relative velocity is zero or is close to zero while the gas current is being pressed through the gas feeding tube 4 and caused an irregular colliding phenomenon.

Therefore, this gas current colliding system $b$ facilitates the collision of the washing liquid L with the dust P. The washing liquid L may be dispersed in advance within the gas feeding tube 4 or applied in the gas current colliding system $b$.

Further, in the embodiment of FIG. 2, the dust-containing gas current is divided into two directions as shown by the symbols $a_1$ and $a_2$ and the dust-containing gas currents $a_1$ and $a_2$ are made to collide with each other. However, the present invention includes the case of making only one of the dust-containing gas currents collide with an ordinary gas current.

It is not necessary to make the dust-containing gas current leading to the gas current jetting ports 2 and 3 one system. Further, leading to the gas current jetting ports through the gas feeding tubes of one system or a plurality of systems from a plurality of dust generating sources can be included in the embodiment of the present invention.

In FIGS. 3 and 4 showing an embodiment wherein the washing liquid L is given near the colliding system $b$, a closing plate 6$a$ is provided above the gas current jetting ports 2 and 3 and the lower side opposed to it is made a discharging port 6$b$. A liquid sprinkling tube 7 is set on the closing plate 6$a$. The gas currents collide with each other in the colliding system $b$ and are forced by the closing plate 6$a$ to turn toward the discharging port 6$b$ and the washing liquid L sprinkled from the liquid sprinkling tube 7 is pulled in toward the discharging port 6$b$ and a film of the washing liquid is easily developed in the colliding system $b$.

In FIG. 5 showing a large dust removing apparatus, a washing liquid (water) L is put into the bottom part of the dust collector 1. The gas feeding tubes 4 are so set as to be dipped at the open ends 4' below the liquid surface and the gas current jetting ports 2 and 3 are opened so as to be opposed to each other in the same position in the intermediate part of the gas feeding tube 4. The liquid sprinkling tube 7 is set above and between the gas current jetting ports 2 and 3.

In this embodiment, comparatively large dust particles drop into the liquid and floating dust particles are jetted out through the jetting ports 2 and 3 and are caught by the washing liquid L in the colliding system $b$.

In accordance with the above-described embodiment of the present invention, the relative velocity between the dust and washing liquid is quite substantial, thus increasing the probability of contact between the dust and washing liquid so that the dust is positively caught by the washing liquid.

In an alternate embodiment of the present invention, by jetting out dust-containing gases as opposed to each other through jetting ports opened as opposed to each other in a washing liquid L, a liquid film is formed in the boundary plane in which both gas currents collide with each other and the dust in the gases is caught by said liquid film.

Here, water is used for the washing liquid L. In the dust-containing gas jetting colliding system, a thin breachless liquid film is formed and, with the rise of the gas, the washing liquid L within the liquid film will be also pulled up to circulate from below and will be gradually blown up onto the liquid surface.

In such case, as the dust-containing gas is subjected to a liquid pressure determined by the liquid depth in which the openings of the jetting ports opposed to each other are positioned, it will be necessary for the dust-containing gas to be pressed by a force large enough to overcome such liquid pressure. Needless to say, it is desirable that both dust-containing gas jetting pressures be equal to each other.

The liquid film is blown up onto the liquid surface and is diffused in the form of a mist and this mist contacts the jetted-out gases rising up along both front and back surfaces of the liquid film and catches the little dust remaining in the gases.

When the dust-containing gases are jetted out under a pressure resisting the liquid pressure so as to be opposed to each other through the jetting ports opening in the washing liquid, the dust-containing gases will collide directly with each other between the jetting ports and will quickly change the flowing direction toward the liquid surface which is lower in pressure.

If the velocity of each dust-containing gas current is $U$ and it is assumed that one of the gas currents is stationary, the respective gas currents will collide with each other at a velocity of $U + U = 2U$. The dust in the gas current having the velocity of $U$ just before the collision will thrust into the film of the washing liquid with an inertia force obtained in the gas current of the velocity of $2U$. The velocity will be maximum in the direction of jetting out the dust-containing gas. Thus, the dust will be separated from the gas.

In order to work this method most effectively, apparatus described as follows is adapted. It is an apparatus particularly adapted to hold a liquid film without breaches by always feeding a washing liquid to form the liquid film with the pressure of dust-containing gases jetted out as opposed to each other.

As in FIG. 6, the dust collector 1 is of such structure that an inner case 1$b$ is contained and fitted within an outer case 1$a$. The outer case 1$a$ has a discharging port 5 at its upper end and a drain 8 at its lower end. Said drain is provided with a valve 9.

A liquid volume regulator 10 is fitted to the side of the outer case 1$a$. The lower side surface of the outer case 1$a$ is provided with a hole 10$a$ around which is fitted an enclosing jacket 10$b$. A dam 10$c$ is provided within the jacket 10$b$ which is provided above said dam with a discharging passage 10$e$ adjustable to be larger or smaller with an adjusting plate 10$d$ moving up and down. The adjusting plate 10$d$ for adjusting the discharging passage 10$e$ is carried at the tip of an adjusting shaft 10$f$ screwed water-tightly into the upper end surface of the jacket 10$b$ so as to be moved up and down by screwing the adjusting shaft 10$f$ up and down to adjust the discharging passage 10 to be larger or smaller. In the drawing, 10$g$ is an adjusting handle.

The inner case 1b set within the outer case 1a is carried and fitted to communicate with the gas feeding tube 4, inserted and set from the side part of the outer case 1a.

As clearly shown in FIG. 9, the inner case 1b is opened at the lower end and substantially communicates with the outer case 1a. Opposed walls 11 extending upward within the inner case 1b and sectioning the lower intermediate part within the inner case 1b to be double are provided in the middle of the lower end of the inner case 1b. These opposed walls may have parts substantially opposed to each other and therefore may form a cylinder supported by such means as a beam within the inner case 1b opened at the lower end.

Jetting ports 2 and 3 communicating with the interior of the outer casing 1a are projected and formed so as to be opposed to each other on the opposed walls 11 of the inner case 1b. Thus, the gas feeding tube 4 substantially communicates with the jetting ports 2 and 3.

The respective tips of the jetting ports 2 and 3 keep a proper distance D between them. The interior of inner case 1b sectioned by the opposed walls 11 into two substantially equal parts communicates with the upper end through the jetting ports 2 and 3 without being closed. This manner is shown particularly in FIG. 7.

In FIG. 8, showing the embodiment in FIG. 6 as vertically sectioned in the middle, the inner case 1b is opened in both side parts between the opposed walls 11 and is closed in the lower part by the washing liquid, and ports 12 are substantially formed above the liquid surface. As in FIG. 8, the gas currents are delivered onto the liquid surface in the outer case 1a through the through ports 12 as indicated by the arrows.

In FIGS. 6 and 8, a liquid sprinkling tube 7 is inserted and fitted in the upper part of the inner case 1b and provided with downwardly directed liquid sprinkling nozzles.

By this liquid sprinkling tube 7, the washing liquid L is sprinkled so as to come into contact with the dust-containing gases fed into the inner case 1b. The washing liquid spray L having washed the dust-containing gases to some extent passes first through the inner case 1b, is sent into the outer case 1a through the opened bottom part of the inner case 1b and finally substantially fills the volume of the outer case 1a and inner case 1b.

In FIGS. 6 and 7, the broken lines shown within the outer case 1a and inner case 1b represent the liquid surface when no dust-containing gas is being pressed in.

The final volume of the washing liquid staying in the outer case 1a and inner case 1b is set to be larger or smaller by the liquid volume regulator 10 in proportion to the dust-containing gas pressing force. In the case of strongly pressing and feeding the dust-containing gases, the liquid volume (the height of the liquid surface) is increased to elevate the hydraulic pressure within the case (particularly between the inner walls 11).

Figure 10:
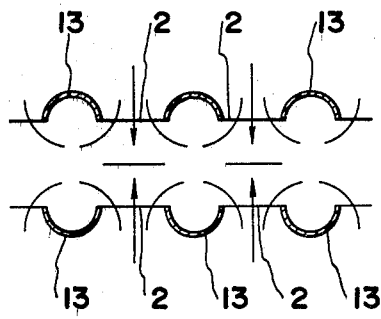
FIG. 10 is a sectioned plan view showing examples of jetting shown in FIG. 10.
Figure 11:
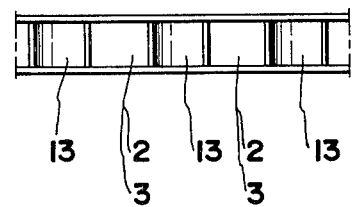
FIG. 11 is an elevation of the same jetting ports.

In case the structures of the jetting ports 2 and 3 are made to be horizontally long as shown in FIG. 8, it will be desirable to section them vertically with wide partition walls 13 as in FIGS. 10 and 11. As clearly shown particularly in FIG. 10, such wide partition walls 13 are concaved in the respective directions reverse to the dust-containing gases $a_1$ and $a_2$ jetting directions indicated by the arrows to provide low pressure parts of the gas currents. Here the dust-containing gas currents are diffracted and the washing liquid is sent in. Thereby, the dust-containing gases jetted out through the jetting ports 2 and 3 are brought into sufficient contact with the washing liquid. In short, the jetting ports 2 and 3 may be arranged so as to be opposed generally to each other and can be of any suitable configuration.

The apparatus operates as follows. First the dust-containing gases are directed through the gas feeding tube 4 to enter the inner case 1b. The liquid sprinkling tube 7 is set in the upper part within the inner case 1b. The washing liquid is sprinkled through the liquid sprinkling nozzles. The washing liquid stays not only in the inner case 1b, but also in the outer case 1a and all the volume of the liquid staying in the cases is regulated by the liquid volume regulator 10 so as to keep a predetermined liquid surface (broken line).

The dust-containing gases are first washed by the washing liquid sprinkled within the inner case 1b so that some dust may be caught and removed. The washing liquid mist having caught the dust stays as it is on the liquid surface in the inner case 1b.

The dust-containing gases press the liquid surface (broken line) within the inner case 1b and push said liquid surface down to the position indicated by the solid line. The dust-containing gas currents $a_1$ and $a_2$ are jetted out into the washing liquid through the jetting ports 2 and 3 formed on the inner walls 11 of the inner case 1b. In this manner, the washing liquid in the inner case 1b is at a level beneath the jetting streams of the dust-containing gases as they are jetted out through jetting ports 2 and 3. However, the dust-containing gas currents $a_1$ and $a_2$ are jetted out through the jetting ports 2 and 3 which are set so as to be opposed to each other, and therefore the currents collide directly with each other as gas currents opposed to each other. The dust-containing gas currents quickly change the direction upwardly in the colliding plane and are discharged upwardly through the liquid surface between the inner walls 11.

In the dust-containing gas colliding system, a liquid film is formed. This liquid film is always fed with the washing liquid by the liquid pressure potential defined by the height of the liquid surface within the outer case 1a pushed up by the part of the liquid surface pushed down within the inner case 1b. Thus, the liquid film is solidly set without gaps.

The dust in the dust-containing gases thrusts into the liquid film with the inertia force or momentum produced by the velocity which is twice as high as of each gas current, and is caught therein. It is desirable to have the liquid film contact and cross the liquid surface in the upper part so that the dust-containing gases may always contact the washing liquid.

The liquid jetted out onto the liquid surface becomes a mist, contacts the gases delivered onto the liquid surface, and further cleans the gases. Such cleaned gases are delivered into the outer case 1a through the through ports 12 opening on the liquid surface and are discharged out through the discharging port 5 which communicates.

According to this embodiment, the dust-containing gases have the dust removed and are cleaned at a high rate. Further, differing from the general filter type, it is not necessary to set any baffle in the gas current passage and therefore the cleaning efficiency is very high.

Depending on the structure of the jetting port, the rate of contact of the washing liquid and dust-containing gas with each other can be increased, and thereby improve the cleaning, dust-removing effect.

I claim:

1. A method of cleaning a gas containing dust, comprising the steps of:
    directing gas in a dust collector structure into two gas currents, with at least one of said gas currents containing dust;
    directing said two currents through a washing liquid;
    colliding said two currents against each other by directing said currents towards each other in a directly opposing manner through two directly opposing spaced apart jetting ports;
    forming a liquid film between said opposing jetting ports by the jetting gas pressure of said two colliding gas currents; and
    cleaning said dust from said gas currents by pressing said at least one gas current containing dust against said liquid film formed between said opposing jetting ports.

2. The method of cleaning a gas containing dust in accordance with claim 1, wherein:
    each of said two gas currents contains dust; and
    said two gas currents containing dust are directed from a common gas current generating source.

3. The method of cleaning gas containing dust in accordance with claim 1, wherein:
    at least a portion of said washing liquid is applied through a liquid sprinkling tube disposed above the space between said opposing jetting ports.

4. The method of cleaning gas containing dust in accordance with claim 1, wherein:
    said two opposing jetting ports are disposed in said washing liquid.

5. An apparatus for cleaning a gas containing dust, comprising:
    a dust collector structure provided with a gas feeding inlet device;
    at least one gas current generating source connected to said gas feeding inlet device;
    said gas feeding inlet device being provided with channels for directing gas supplied by said generating source into two currents, with at least one of said gas currents containing dust;
    said structure having a washing liquid disposed therein;
    said inlet device having two directly opposing spaced apart jetting ports provided in each of said channels, said jetting ports being disposed in said washing liquid so as to provide a gas-liquid contact zone;
    each of said gas currents being directed through said washing liquid and jetted out through a corresponding one of said opposing jetting ports so that said currents will collide with each other in a directly opposing manner;
    a liquid film formed between said jetting ports by said colliding gas currents for cleaning said gas containing dust; and
    said structure being provided with a clean gas discharge port communicating with said gas-liquid contact zone.

6. An apparatus in accordance with claim 5, wherein:
    only one gas current generating source is provided connected to said gas feeding inlet device; and
    each of said gas currents contain dust.

7. An apparatus in accordance with claim 5, wherein:
    said dust collector structure includes an outer case with said gas feeding inlet device comprising a case disposed within said outer case;
    said outer case contains said liquid;
    said inner case is at least partially disposed in said washing liquid;
    the portion of said inner case which is disposed in said washing liquid communicates with said outer case and said portion includes said opposing jetting ports; and
    said discharge port is provided in said outer case.

8. An apparatus in accordance with claim 7, wherein:
    said opposing jetting ports are horizontally elongated jetting ports; and
    each said jetting port is provided with a plurality of wide partition sectioning walls.

9. An apparatus in accordance with claim 7, wherein:
    said outer case is provided with liquid volume regulating means for adjusting the volume of said washing liquid in said outer case.

* * * * *